(12) United States Patent
Peng

(10) Patent No.: US 12,204,682 B2
(45) Date of Patent: Jan. 21, 2025

(54) DATA PROCESSING METHOD, APPARATUS, AND SYSTEM, DEVICE, AND MEDIUM

(71) Applicant: HUAWEI TECHNOLOGIES CO., LTD., Shenzhen (CN)

(72) Inventor: Kun Peng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 231 days.

(21) Appl. No.: 17/973,303

(22) Filed: Oct. 25, 2022

(65) Prior Publication Data

US 2023/0046195 A1    Feb. 16, 2023

Related U.S. Application Data

(63) Continuation of application No. PCT/CN2021/086716, filed on Apr. 12, 2021.

(30) Foreign Application Priority Data

Apr. 26, 2020 (CN) .......................... 202010338323.7
Jul. 22, 2020 (CN) .......................... 202010710180.8

(51) Int. Cl.
*G06F 21/62* (2013.01)
*G06F 21/60* (2013.01)

(52) U.S. Cl.
CPC ........ *G06F 21/6263* (2013.01); *G06F 21/602* (2013.01)

(58) Field of Classification Search
CPC ............... G06F 21/6263; G06F 21/602; G06F 21/6245; H04L 2209/42; H04L 9/008
USPC ............................................................ 726/26
See application file for complete search history.

(56) References Cited

U.S. PATENT DOCUMENTS

| 9,094,378 | B1 | 7/2015 | Yung et al. | |
|---|---|---|---|---|
| 2003/0108199 | A1* | 6/2003 | Pinder | H04N 21/4147 348/E7.063 |
| 2018/0198602 | A1 | 7/2018 | Duffy et al. | |
| 2021/0067323 | A1* | 3/2021 | Dambal | H04L 9/083 |

FOREIGN PATENT DOCUMENTS

| CN | 106230776 A | 12/2016 |
|---|---|---|
| CN | 108650269 A | 10/2018 |
| CN | 109241016 A | 1/2019 |
| CN | 109726580 A | 5/2019 |
| CN | 110474764 A | 11/2019 |
| CN | 110601814 A | 12/2019 |

* cited by examiner

*Primary Examiner* — Jacob Lipman
(74) *Attorney, Agent, or Firm* — Leydig, Voit & Mayer, Ltd.

(57) ABSTRACT

A data providing apparatus obtains first privacy data and second privacy data, encrypts the first privacy data by using an encryption algorithm to obtain a ciphertext of the first privacy data, and sends the ciphertext of the first privacy data and the second privacy data to a data processing apparatus. The data processing apparatus inputs the ciphertext of the first privacy data and the second privacy data into a ciphertext computation function to obtain a ciphertext of a data processing result. In this way, the first privacy data is used in computation in a ciphertext form, thereby ensuring security. In addition, the second privacy data is used in computation in a plaintext form, thereby reducing ciphertext input for the ciphertext computation function.

20 Claims, 8 Drawing Sheets

DATA PROCESSING METHOD, APPARATUS, AND SYSTEM, DEVICE, AND MEDIUM

CROSS-REFERENCE TO RELATED APPLICATIONS

This application is a continuation of International Application No. PCT/CN2021/086716, filed on Apr. 12, 2021, which claims priority to Chinese Patent Application No. 202010710180.8, filed on Jul. 22, 2020, and Chinese Patent Application No. 202010338323.7, filed on Apr. 26, 2020. All of the aforementioned applications are hereby incorporated by reference in their entireties.

TECHNICAL FIELD

This application relates to the field of computer technologies, and in particular, to a data processing method, apparatus, and system, a device, and a computer-readable storage medium.

BACKGROUND

With the development of information technologies, service providers that provide various services to users accumulate a large amount of data. The service providers can optimize the services they provide based on the data, but privacy security issues arise accordingly. To ensure user privacy, a secure computation policy is proposed in the industry. Secure computation means that a user encrypts private input and submits encrypted private input to a computation node, the computation node performs computation on a ciphertext, and all computation data is in ciphertext in a computation process. In this way, the service provider cannot obtain original computation data, thereby avoiding privacy leakage.

However, secure computation depends on a special encryption algorithm and ciphertext computation protocol, which is costly and inefficient. As a result, a service response speed is slow and service performance deteriorates.

SUMMARY

This application provides a data processing method, to resolve problems in a related technology that a service response speed is slow and service performance deteriorates due to high consumption and low efficiency. This application further provides an apparatus, a system, a device, a computer-readable storage medium, and a computer program product corresponding to the foregoing method.

According to a first aspect, this application provides a data processing method. The method is applied to a data processing system that uses a ciphertext computation function to provide secure computation for a user. The data processing system includes a data providing apparatus and a data processing apparatus.

Specifically, the data providing apparatus obtains first privacy data and second privacy data, encrypts the first privacy data by using an encryption algorithm to obtain a ciphertext of the first privacy data, and then sends the ciphertext of the first privacy data and the second privacy data to the data processing apparatus. Correspondingly, the data processing apparatus inputs the ciphertext of the first privacy data and the second privacy data into a ciphertext computation function, to obtain a ciphertext of a data processing result. The ciphertext computation function corresponds to the foregoing encryption algorithm. The data processing apparatus sends the ciphertext of the data processing result to the data providing apparatus, and the data providing apparatus decrypts the ciphertext of the data processing result to obtain the data processing result.

In the method, the first privacy data is used in computation in a ciphertext form, and the second privacy data is used in computation in a plaintext form. In this way, an amount of input ciphertext in a secure computation process can be reduced, computation complexity can be reduced, computation efficiency can be improved, and a service requirement can be met. In this way, a service response speed can be improved, and service performance can be improved.

In some possible implementations, the data processing apparatus may construct ciphertext computation functions, to meet requirements of different service scenarios for secure computation. Specifically, the data providing apparatus obtains a data processing requirement, and sends the data processing requirement to the data processing apparatus, and then the data processing apparatus constructs the ciphertext computation function according to the data processing requirement.

The data processing requirement carries a requirement description. The requirement description describes at least data that needs to be processed (referred to as input data in embodiments of this application) and expected data (referred to as output data in embodiments of this application). Based on this, the requirement description includes an identifier of input data and an identifier of output data. The identifier of the input/output data may be a name or an identifier of the input/output data.

The data processing apparatus may construct, based on the input data and the output data in the requirement description, a plaintext computation function by using an association relationship between the data, and then construct a corresponding ciphertext computation function based on the plaintext computation function and a form (including two forms: plaintext and ciphertext) of the input data. Input of the ciphertext computation function includes a plaintext input item and a ciphertext input item.

Because the data processing apparatus may construct a corresponding ciphertext computation function according to a data processing requirement instead of providing a fixed ciphertext computation function, secure computation is implemented, and personalized data processing is implemented.

In some possible implementations, the data providing apparatus may specify the encryption algorithm used to encrypt the first privacy data, to ensure security of the privacy data and the data processing result. Specifically, the data processing requirement includes an identifier of the encryption algorithm, and the data processing apparatus constructs, according to the data processing requirement, the ciphertext computation function corresponding to the encryption algorithm.

In some possible implementations, the requirement description in the data processing requirement may further include data processing logic. The data processing logic is logic for processing the input data to obtain the output data. For example, the data processing logic may represent how to perform several operations on the input data, such as an addition operation, a multiplication operation, an exponentiation operation, and an exponentiation operation, to obtain the output data. The data processing logic may be represented in different forms, for example, a text or a plaintext computation function. The data processing apparatus may construct the plaintext computation function based on data processing logic represented in a text form, or directly obtain the plaintext computation function based on data processing logic represented in a plaintext computation function form.

In some possible implementations, the ciphertext computation function includes a constant term. The ciphertext computation function may be a polynomial, and each monomial in the polynomial is referred to as a term of the polynomial. An item irrelevant to the ciphertext of the first privacy data is a constant item. The data processing apparatus inputs the second privacy data as the constant term into the ciphertext computation function, to obtain the ciphertext of the data processing result.

For ease of understanding, the following provides description with reference to an example.

In this example, an original plaintext computation function is $f(m_1, m_2, m_3, m_4, m_5)=a_0+a_1m_1+a_2m_{22}+a_3m_{33}+a_4m_{44}+a_5m_{55}$. Herein, m4 and m5 are second privacy data, for example, relative privacy data such as a sales growth rate or a medical scan image. Based on this, the plaintext computation function may also be expressed as $f=a'_0a_1m_1+a_2m_{22}+a_3m_{33}$, where $a'_0=a_0+a_4m_{44}+a_5m_{55}$. Herein, $a'_0$ is a constant term of the plaintext computation function. When the plaintext computation function is mapped to a ciphertext computation function, no complex computation needs to be performed on a constant term of the plaintext computation function. In secure computation, only three ciphertexts E(m1), E(m2), and E(m3) need to be input for complex computation. In this way, an amount of input ciphertext is reduced, computation complexity is reduced, and computation efficiency is improved.

In some possible implementations, the ciphertext computation function may be preset in the data processing apparatus, to provide a specific data processing service. In addition, the data processing apparatus does not need to additionally construct a ciphertext computation function according to a data processing requirement, thereby reducing a workload of the data processing apparatus.

In some possible implementations, the data providing apparatus does not encrypt the second privacy data by using the encryption algorithm. Therefore, the first privacy data is used in computation in a ciphertext form, thereby ensuring security, and the second privacy data is used in computation in a plaintext form, thereby reducing an amount of input ciphertext, reducing computation complexity, and improving computation efficiency.

In some possible implementations, the data processing apparatus cannot decrypt the ciphertext of the first privacy data. In this way, the first privacy data is prevented from being stolen or leaked by the data processing apparatus, and security of the first privacy data is ensured.

In some possible implementations, a privacy level of the first privacy data is higher than a privacy level of the second privacy data. For example, the first privacy data may be absolute privacy data, and the second privacy data may be relative privacy data. Absolute privacy refers to a level at which once content is disclosed, user privacy security will be endangered. Relative privacy refers to a level at which even if content is disclosed, user privacy security will not be endangered as long as a data subject is not contacted.

For ease of understanding, this application further provides some examples of the first privacy data and the second privacy data. For example, in a financial system, the first privacy data may include an industrial and commercial registration number, a tax number, a stock code, a specific address, a bank account, transaction object information, dividend shareholder information, loan bank information, a value-added tax invoice, and audit information of an enterprise, and the second privacy data may include a debt ratio, a loan interest rate, a dividend distribution ratio, a home region, a tax rate, and a credit rating.

In some possible implementations, the data processing system may further provide secure computation for a user in a cloud service manner. Specifically, the data providing apparatus may present a user interface to the user, for example, present a graphical user interface or a command user interface (CUI). The data providing apparatus receives, through the foregoing user interface, a privacy level input by the user, and the data providing apparatus obtains the first privacy data and the second privacy data from input data of the user based on the privacy level. In this way, the data providing apparatus may encrypt the first privacy data by using the encryption algorithm to obtain the ciphertext of the first privacy data, and send the ciphertext of the first privacy data and the second privacy data to the data processing apparatus for secure computation. This ensures security of the first privacy data, reduces ciphertext input of the ciphertext computation function, and improves computation efficiency.

In some possible implementations, the data providing apparatus sends the second privacy data to the data processing apparatus anonymously. For example, the data providing apparatus may send the second privacy data to the data processing apparatus through onion routing or garlic routing. In this way, a risk of leakage of an association relationship between the second privacy data and a subject can be reduced, and security of the second privacy data can be ensured.

Further, the data providing apparatus may also send the ciphertext of the first privacy data to the data processing apparatus anonymously. In this way, the ciphertext of the first privacy data is not decrypted by the data processing apparatus and a third party, and content of the ciphertext of the first privacy data is not leaked, thereby ensuring security. In addition, the subject of the first privacy data is not leaked. In this way, security of the first privacy data can be ensured by using a dual protection mechanism.

According to a second aspect, this application provides a data processing method. The method is applied to a data processing apparatus. Specifically, the data processing apparatus receives a ciphertext of first privacy data and second privacy data, where the ciphertext of the first privacy data is obtained by encrypting the first privacy data by using an encryption algorithm. Then, the data processing apparatus inputs the ciphertext of the first privacy data and the second privacy data into a ciphertext computation function, to obtain a ciphertext of a data processing result, where the ciphertext computation function corresponds to the foregoing encryption algorithm. Then, the data processing apparatus sends the ciphertext of the data processing result to the data providing apparatus.

In the method, the first privacy data always is used in computation in a ciphertext form, thereby ensuring security. The second privacy data is used in computation in a plaintext form. In this way, ciphertext input of the ciphertext computation function is reduced, computation complexity is reduced, computation efficiency is improved, and service performance is improved. In addition, the data processing result is transmitted to the data providing apparatus in a ciphertext form, and the data providing apparatus decrypts the ciphertext of the data processing result, thereby ensuring security of the data processing result.

In some possible implementations, the data processing apparatus receives a data processing requirement sent by the data providing apparatus, and constructs the ciphertext computation function according to the data processing requirement. In this way, a corresponding secure computation service can be provided for a user according to a requirement of the user.

In some possible implementations, the data processing requirement includes an identifier of the encryption algorithm. That is, the user may further specify the encryption algorithm used to encrypt the first privacy data. Correspondingly, the data processing apparatus constructs, according to the data processing requirement, the ciphertext computation function corresponding to the encryption algorithm. In this way, security of the first privacy data can be further ensured.

In some possible implementations, the ciphertext computation function includes a constant term. The ciphertext computation function may be a polynomial, and each monomial in the polynomial is referred to as a term of the polynomial. An item irrelevant to the ciphertext of the first privacy data is a constant item. The data processing apparatus inputs the second privacy data as the constant term into the ciphertext computation function, to obtain the ciphertext of the data processing result. Because ciphertext input is reduced, complexity of ciphertext computation is greatly reduced, and computation efficiency is greatly improved.

In some possible implementations, the data processing apparatus cannot decrypt the ciphertext of the first privacy data. In this way, the first privacy data is prevented from being leaked or stolen by decrypting the ciphertext of the first privacy data by the data processing apparatus. This improves security of the first privacy data.

According to a third aspect, this application provides a data processing system. The data processing system is configured to provide secure computation for a user by using a ciphertext computation function, and the data processing system includes a data providing apparatus and a data processing apparatus. The data providing apparatus is configured to obtain first privacy data, encrypt the first privacy data by using an encryption algorithm to obtain a ciphertext of the first privacy data, obtain second privacy data, and then send the ciphertext of the first privacy data and the second privacy data to the data processing apparatus. The data processing apparatus is configured to input the ciphertext of the first privacy data and the second privacy data into the ciphertext computation function to obtain a ciphertext of a data processing result, and send the ciphertext of the data processing result to the data providing apparatus, where the ciphertext computation function corresponds to the encryption algorithm. The data providing apparatus is further configured to obtain the data processing result based on the ciphertext of the data processing result.

In some possible implementations, the data providing apparatus is further configured to:
obtain a data processing requirement, and send the data processing requirement to the data processing apparatus.

The data processing apparatus is further configured to:
construct the ciphertext computation function according to the data processing requirement.

In some possible implementations, the data processing requirement includes an identifier of the encryption algorithm.

The data processing apparatus is configured to:
construct, according to the data processing requirement, the ciphertext computation function corresponding to the encryption algorithm.

In some possible implementations, the ciphertext computation function includes a constant term.

The data processing apparatus is configured to:
input the second privacy data as the constant term into the ciphertext computation function.

In some possible implementations, the data providing apparatus does not encrypt the second privacy data by using the encryption algorithm.

In some possible implementations, the data processing apparatus cannot decrypt the ciphertext of the first privacy data.

In some possible implementations, a privacy level of the first privacy data is higher than a privacy level of the second privacy data.

In some possible implementations, the data providing apparatus is configured to:
present a user interface to the user;
receive, through the user interface, a privacy level input by the user; and
obtain the first privacy data and the second privacy data from input data of the user based on the privacy level.

In some possible implementations, the data providing apparatus is further configured to:
send the second privacy data to the data processing apparatus anonymously.

According to a fourth aspect, this application provides a data processing apparatus. The apparatus includes:
a communication module, configured to receive a ciphertext of first privacy data and second privacy data, where the ciphertext of the first privacy data is obtained by encrypting the first privacy data by using an encryption algorithm; and
a processing module, configured to input the ciphertext of the first privacy data and the second privacy data into a ciphertext computation function, to obtain a ciphertext of a data processing result, where the ciphertext computation function corresponds to the encryption algorithm.

The communication module is further configured to send the ciphertext of the data processing result to the data providing apparatus.

In some possible implementations, the data processing apparatus further includes a construction module.

The communication module is further configured to receive a data processing requirement sent by the data providing apparatus.

The construction module is configured to construct the ciphertext computation function according to the data processing requirement.

In some possible implementations, the data processing requirement includes an identifier of the encryption algorithm.

The construction module is configured to:
construct, according to the data processing requirement, the ciphertext computation function corresponding to the encryption algorithm.

In some possible implementations, the ciphertext computation function includes a constant term.

The processing module is configured to:
input the second privacy data as the constant term into the ciphertext computation function.

In some possible implementations, the data processing apparatus cannot decrypt the ciphertext of the first privacy data.

According to a fifth aspect, this application provides a device. The device includes a processor and a memory.

The processor is configured to execute instructions stored in the memory, so that the device performs the data processing method according to any one of the second aspect or the implementations of the second aspect.

According to a sixth aspect, this application provides a computer-readable storage medium. The computer-readable storage medium stores instructions. The instructions instruct the device to perform the data processing method according to any one of the second aspect or the implementations of the second aspect.

According to a seventh aspect, this application provides a computer-readable storage medium. The computer-readable storage medium stores instructions. The instructions instruct the data processing system to perform the data processing method according to any one of the first aspect or the implementations of the first aspect.

According to an eighth aspect, this application provides a computer program product that includes instructions. When the computer program product runs on a device, the device is enabled to perform the data processing method according to any one of the second aspect or the implementations of the second aspect.

According to a ninth aspect, this application provides a computer program product including instructions. When the computer program product runs on the data processing system, the data processing system is enabled to perform the data processing method according to any one of the first aspect or the implementations of the first aspect.

In this application, on the basis of the implementations according to the foregoing aspects, the implementations may be further combined to provide more implementations.

BRIEF DESCRIPTION OF DRAWINGS

To describe the methods in embodiments of this application more clearly, the following briefly describes the accompanying drawings for embodiments.

DETAILED DESCRIPTION

Figure 1:
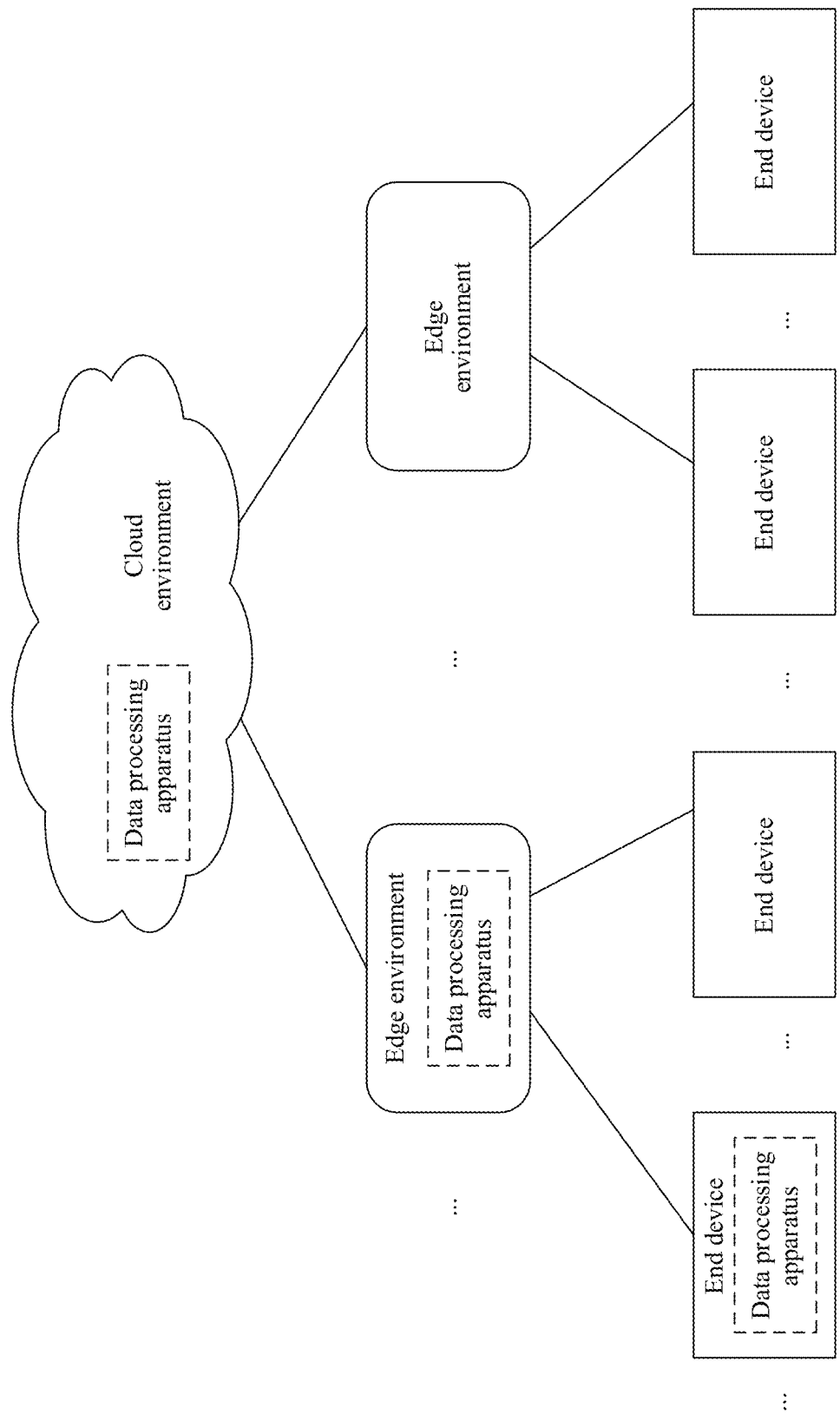
FIG. 1 is a diagram of a system architecture of a data processing method according to an embodiment of this application.

Terms "first" and "second" in embodiments of this application are merely intended for description, and shall not be understood as an indication or implication of relative importance or implicit indication of a quantity of indicated features. Therefore, a feature limited by "first" or "second" may explicitly or implicitly include one or more features.

First, some technical terms in embodiments of this application are described.

Secure computation is an important means to protect data security in information technology (IT) applications. The secure computation is to complete a data computation task on the basis of protecting data privacy. Specifically, data provided by a data provider includes privacy data (that is, data carrying privacy information), and the data provider encrypts the privacy data by using an encryption algorithm to obtain a ciphertext of the privacy data. A computation party computes the ciphertext of the privacy data by using a ciphertext computation function, and the privacy data always exists in a ciphertext form in a computation process. This ensures security of the privacy data.

Further, the computation party may obtain a ciphertext of a computation result by performing computation on the ciphertext of the privacy data. In some cases, the computation result also carries the privacy information. Therefore, the computation party may return the ciphertext of the computation result to the data provider, and the data provider decrypts the ciphertext of the computation result to obtain the computation result. In this way, the data computation task is completed. In addition, security of the computation result is ensured.

There may be one or more data providers participating in computation. For ease of description, in this application, a scenario in which only one data provider provides data for secure computation is referred to as a single-user scenario, and a scenario in which a plurality of data providers separately provide data for secure computation is referred to as a multi-user scenario or secure multi-party computation (SMPC). SMPC is mainly used to resolve a collaborative computation problem of privacy protection between a group of untrusted data providers. To be specific, SMPC needs to ensure independence of input and a correctness of computation, and do not disclose an input value to another data provider involved in computation.

In both single-user and multi-user scenarios, special encryption algorithm and corresponding ciphertext computation functions are used to implement secure computation. The special encryption algorithm includes any one or more of a garbled circuit algorithm, a homomorphic encryption algorithm, a secret sharing algorithm, and the like.

The computation party further provides a ciphertext computation function corresponding to a plaintext computation function, so that a function value obtained by inputting the ciphertext of the privacy data into the ciphertext computation function is equal to a ciphertext of a function value obtained by inputting the plaintext of the privacy data into the plaintext computation function. For details, refer to the following formula:

$$F(E(m_1),E(m_2), \ldots E(m_n))=E(f(m_1,m_2, \ldots m_m)) \quad (1)$$

Herein, $m_1$, $m_2$, and $m_n$ represent privacy data, f represents the plaintext computation function, F represents the ciphertext computation function corresponding to the plaintext computation function f, E represents the encryption algorithm, $E(m_1)$, $E(m_2)$, $E(m_n)$ represent ciphertexts of the privacy data obtained by encrypting the privacy data by using the encryption algorithm, and n is a positive integer.

However, complexity of the ciphertext computation function is related to ciphertext input. All privacy data involved in computation is encrypted. As a result, ciphertext input in secure computation reaches the maximum, and computation efficiency is very low. Especially when a plaintext computation function is complex, and high-consumption secure computation technologies such as full homomorphic encryption are used, computation efficiency cannot meet requirements, a service response speed is slow, and service performance deteriorates.

In view of this, an embodiment of this application provides a data processing method. The method is executed by a data processing apparatus. In the method, privacy data is classified into different privacy levels, and the data processing apparatus separately uses different processing mechanisms for privacy data of different privacy levels. Specifically, computation is directly performed on privacy data with a high privacy level based on a ciphertext of the privacy data, and computation is directly performed on privacy data with a low privacy level based on a plaintext of the privacy data. In this way, an amount of input ciphertext in a secure computation process can be reduced, computation complexity is reduced, computation efficiency is improved, and a service requirement can be met. In this way, a service response speed can be improved, and service performance can be improved.

For data with a high privacy level, the data exists in a ciphertext form in an entire secure computation process, thereby ensuring security. For data with a low privacy level, the data can be submitted to the data processing apparatus anonymously. Even if the data is leaked, security can be ensured as long as an association relationship between the data and a subject (a data provider or a data producer) is not leaked. In this way, efficient secure computation is implemented on the basis of ensuring data privacy.

As shown in FIG. 1, the data processing apparatus may be deployed in a cloud environment, and is specifically deployed on one or more computation devices (for example, central servers) in the cloud environment. The data processing apparatus may alternatively be deployed in an edge environment, and is specifically deployed on one or more computation devices (edge computation devices) in the edge environment. The edge computation device may be a server, a computation box, or the like. The cloud environment indicates a central computation device cluster owned by a cloud service provider and configured to provide computation, storage, and communication resources. The edge environment indicates an edge computation device cluster, geographically close to an end device (namely, an end-side device), that is configured to provide computation, storage, and communication resources.

The foregoing data processing apparatus may also be deployed on the end device. The device includes a physical machine, for example, a terminal. The terminal includes but is not limited to a desktop computer, a notebook computer, a tablet computer, or a smartphone. Alternatively, the data processing apparatus may be deployed in a virtual machine or a container on the foregoing physical machine. Considering load balancing and reliability, in some implementations, the data processing apparatus may alternatively be deployed in a cluster in a form of a plurality of copies.

Figure 2:
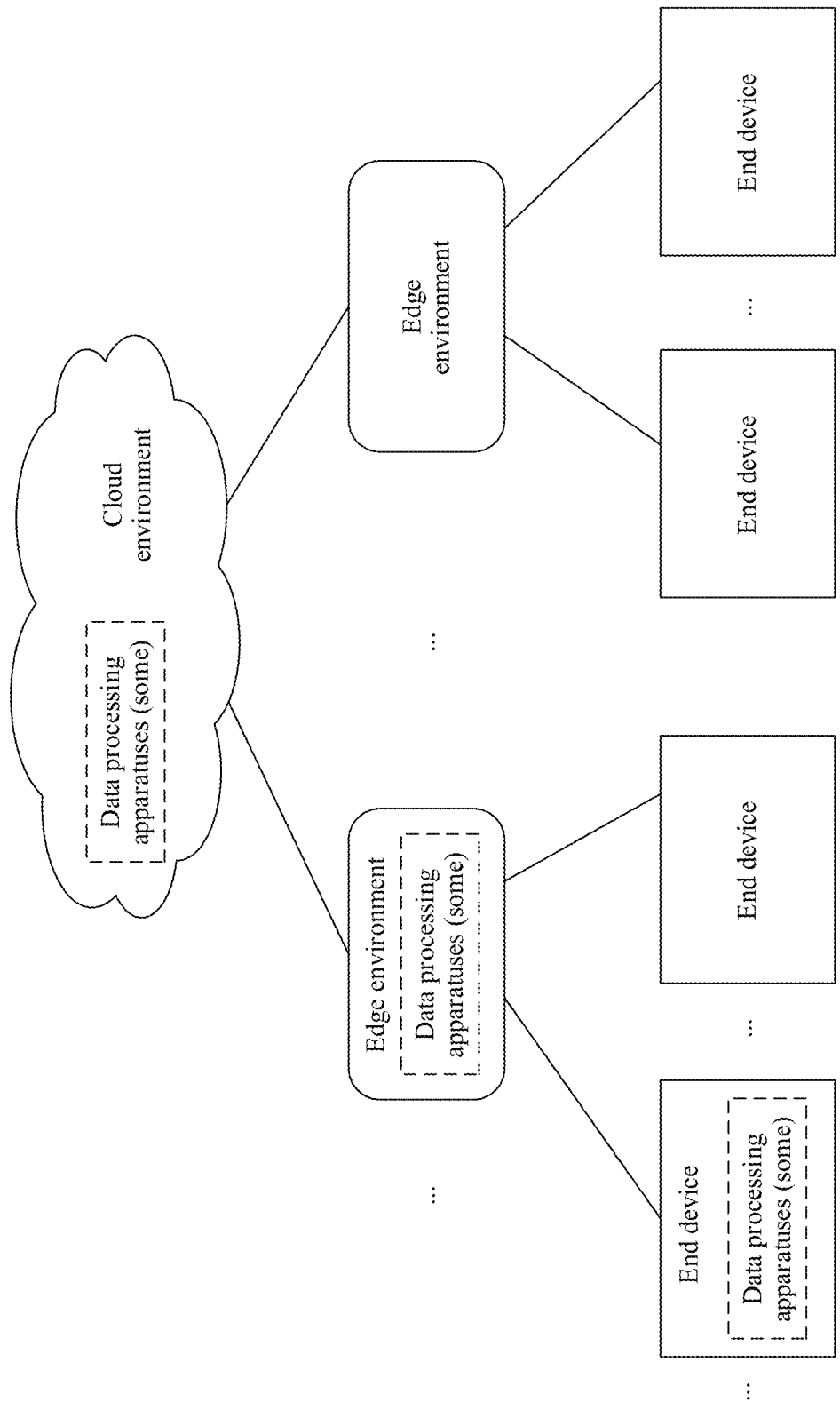
FIG. 2 is another diagram of a system architecture of a data processing method according to an embodiment of this application.

Further, as shown in FIG. 2, the data processing apparatus may include a plurality of parts (for example, include a plurality of function modules). Based on this, the parts of the data processing apparatus may alternatively be deployed in different environments in a distributed manner. For example, a part of the data processing apparatus may be separately deployed in three environments: the cloud environment, the edge environment, and the end device, or any two of the three environments.

Figure 3:
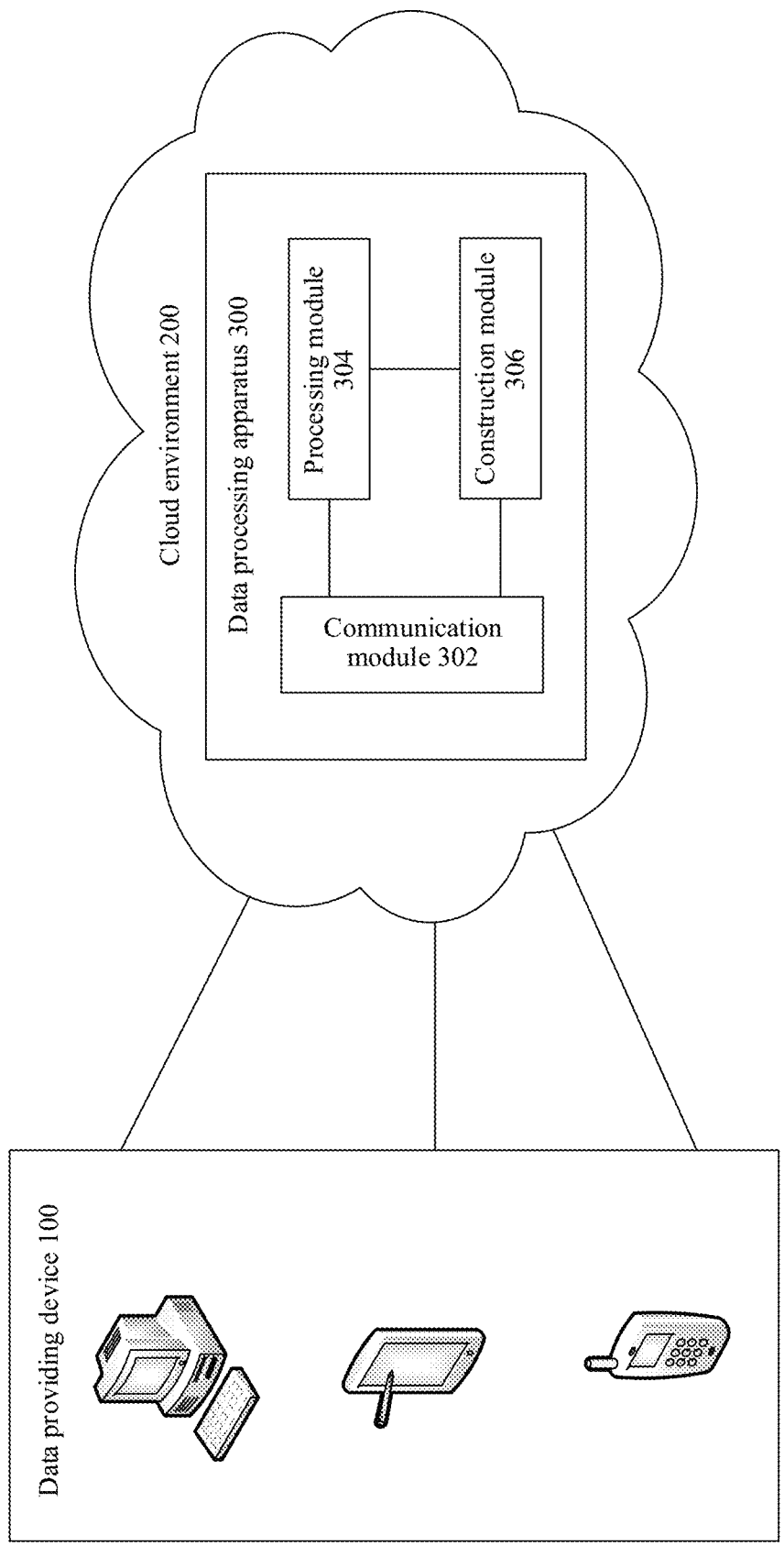
FIG. 3 is a diagram of an application scenario of a data processing method according to an embodiment of this application.

The function modules inside the data processing apparatus may be divided in a plurality of manners. This is not limited in this application. FIG. 3 is an example division manner. As shown in FIG. 3, a data processing apparatus 300 includes a communication module 302 and a processing module 304. Optionally, the data processing apparatus 300 may further include a construction module 306. The data processing apparatus 300 is deployed in a cloud environment 200, and a communication path is established between at least one data providing device 100 and the cloud environment 200.

A data providing apparatus (not shown in FIG. 3) on the data providing device 100 provides source data, where the source data refers to original data, and the original data is usually a plaintext. The data providing apparatus may be an application, for example, a database, or may be a data processing client having a user interface. The data processing apparatus may be a dedicated data processing client, for example, a client of a salary management application or an attendance management application. A user may input source data through a graphical user interface (GUI) provided by the client, to provide the source data. The data processing application may alternatively be a client of a general-purpose data processing application, for example, a browser. The browser can load corresponding data processing pages, for example, a salary management page and an attendance management page. In this way, the user can input source data through these pages. The user interface includes but is not limited to a GUI. For example, the user interface may alternatively be a command user interface (CUI).

Specifically, the data providing apparatus may send a data processing requirement to the data processing apparatus. The communication module 302 of the data processing apparatus 300 is configured to receive the data processing requirement, and the construction module 306 of the data processing apparatus 300 is configured to construct a plaintext computation function and a ciphertext computation function corresponding to the data processing requirement, to meet a personalized requirement. In some implementations, the data processing apparatus 300 may provide a specific plaintext computation function and a corresponding ciphertext computation function, to meet a specific data processing requirement.

When the data providing apparatus sends the data processing requirement, the data processing apparatus 300 may provide an encryption algorithm by default, or the data providing apparatus specifies an encryption algorithm. The encryption algorithm is used to encrypt data to obtain a corresponding ciphertext, for example, encrypt privacy data in source data to obtain a ciphertext of the privacy data.

The source data includes the privacy data. The data providing apparatus may process the privacy data based on a level of the privacy data, and then submit processed privacy data to the data processing apparatus 300 for processing. Specifically, the data providing apparatus may encrypt privacy data with a high privacy level (referred to as first privacy data in this embodiment of this application for ease of description) by using the encryption algorithm to obtain a ciphertext of the first privacy data, and then send the ciphertext of the first privacy data and data with a low privacy level (referred to as second privacy data in this embodiment of this application for ease of description) to the data processing apparatus 300.

The processing module 304 of the data processing apparatus 300 is configured to process the ciphertext of the first privacy data and the second privacy data by using the ciphertext computation function. Specifically, the processing module 304 is configured to input the ciphertext of the first privacy data and the second privacy data into the ciphertext computation function, to obtain a ciphertext of a data processing result. Then, the communication module 302 of the data processing apparatus 300 returns the ciphertext of the data processing result to the data providing apparatus, and the data providing apparatus may decrypt the ciphertext of the data processing result to obtain the data processing result.

When submitting the ciphertext of the first privacy data and the second privacy data, the data providing apparatus may further submit the ciphertext of the first privacy data and the second privacy data anonymously. In this way, it can be ensured that a linkability characteristic between the privacy data and a subject is not leaked, thereby ensuring security of the second privacy data. In addition, security of the first privacy data is protected by using a dual protection mechanism.

FIG. 3 is described by using an example in which the data processing apparatus 300 is deployed in the cloud environment. In another possible implementation of this embodiment of this application, the data processing apparatus 300 may alternatively be deployed in the edge environment or the end device, or deployed in different environments in a distributed manner. This is not limited in embodiments of this application.

The following describes the data processing method provided in this embodiment of this application from a perspective of interaction between the data providing apparatus and the data processing apparatus 300.

Figure 4A:
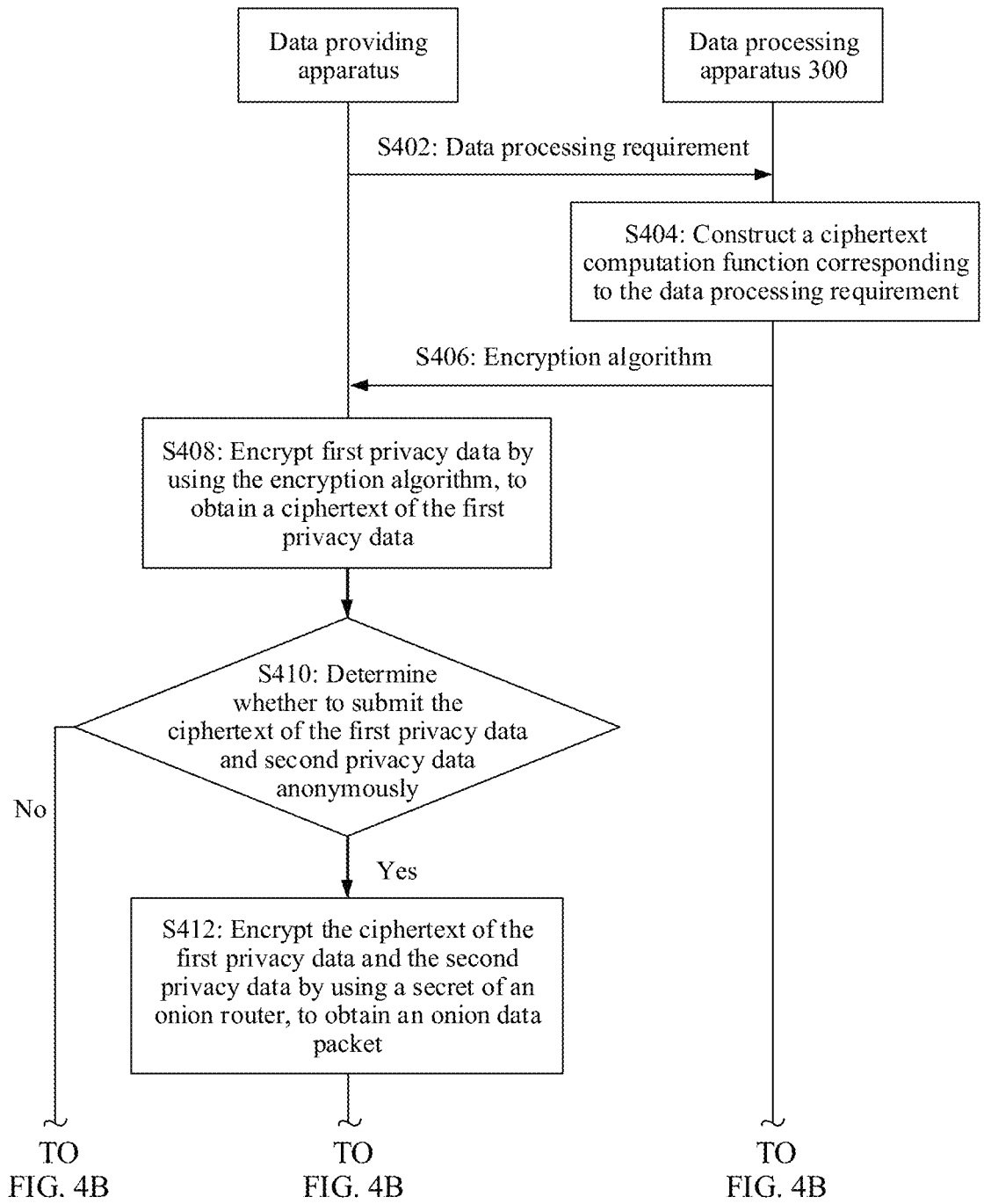
FIG. 4A and FIG. 4B are a flowchart of interaction of a data processing method according to an embodiment of this application.
Figure 4B:
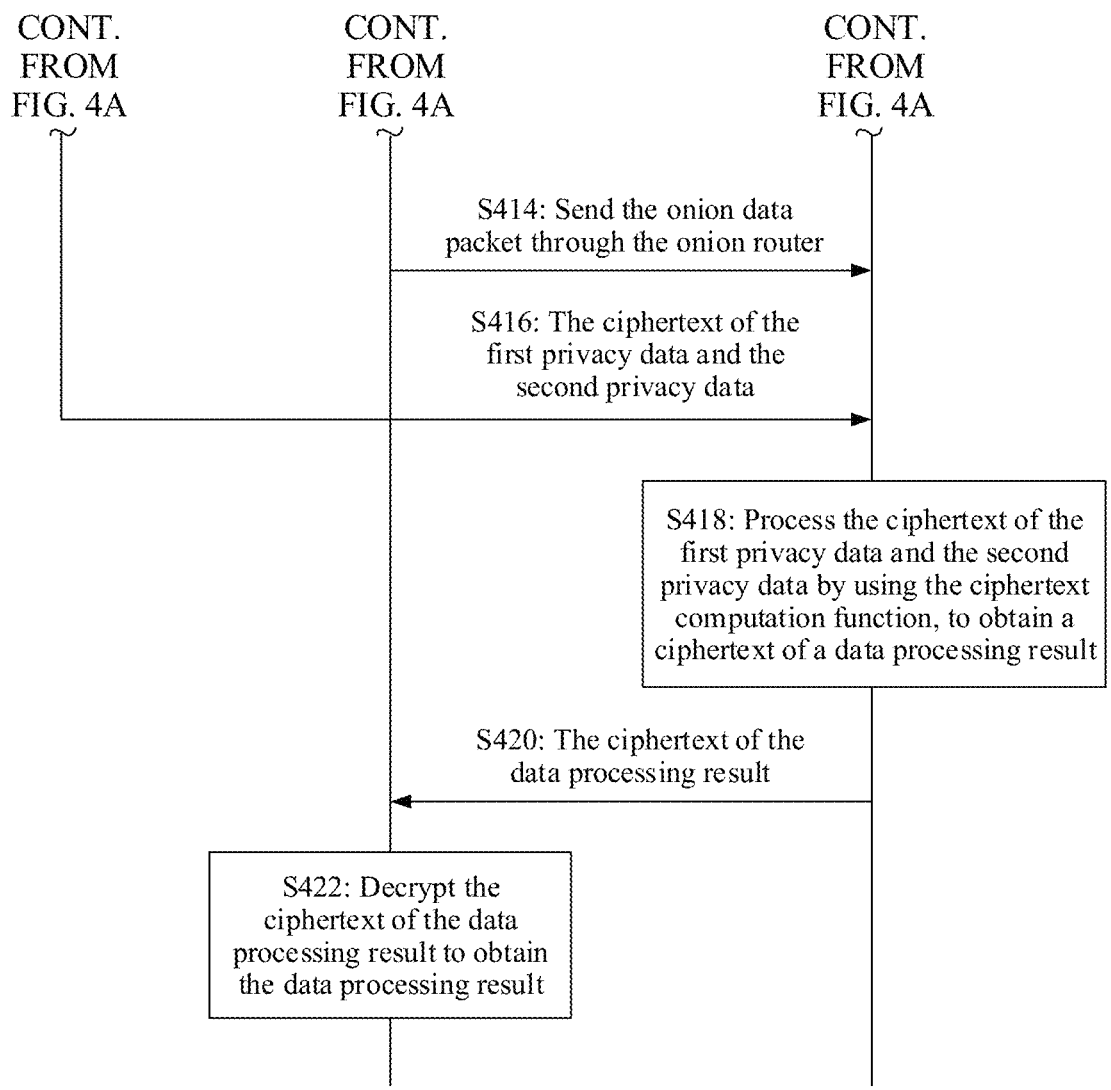

Refer to an interaction flowchart of the data processing method shown in FIG. 4A and FIG. 4B. The method includes the following steps.

S402: The data providing apparatus sends a data processing requirement to the data processing apparatus 300.

A requirement description is carried in the data processing requirement. The requirement description describes at least data that needs to be processed (referred to as input data in this embodiment of this application) and expected data (referred to as output data in this embodiment of this application). Based on this, the requirement description includes an identifier of the input data and an identifier of the output data. The identifier of the input/output data may be a name or an identifier of the input/output data.

Further, the requirement description may further describe data processing logic. The data processing logic is logic for processing the input data to obtain the output data. For example, the data processing logic may represent how to perform several operations on the input data, such as an addition operation, a multiplication operation, an exponentiation operation, and an exponentiation operation, to obtain the output data. The data processing logic may be represented in different forms, for example, a text or a plaintext computation function.

The data processing apparatus sends the foregoing requirement description to the data processing apparatus 300, so that the construction module 306 of the data processing apparatus 300 may obtain, based on the foregoing requirement description, the plaintext computation function used to process the input data, and construct a ciphertext computation function based on the plaintext computation function and an encryption algorithm used to encrypt the input data.

The plaintext computation function is used to process a plaintext (specifically, the input data) to obtain a data processing result (specifically, a plaintext of the data processing result). The ciphertext computation function is used to process a ciphertext (specifically, a ciphertext of the input data) to obtain a ciphertext of a data processing result (specifically, output data of the plaintext computation function). The ciphertext of the data processing result is equal to a result obtained after the data processing result obtained by performing data processing by using the plaintext computation function is encrypted by using the encryption algorithm, and the ciphertext of the data processing result may be decrypted to obtain the data processing result. In this way, secure computation can be implemented.

In some implementations, the requirement description may alternatively include an identifier of the encryption algorithm, which is an identifier of an encryption algorithm specified by a user. The encryption algorithm may be a public encryption algorithm, for example, a symmetric encryption algorithm, for example, a data encryption standard (DES) or an advanced encryption standard (AES), or an asymmetric encryption algorithm, for example, Rivest Shamir Adleman (RSA) or elliptic curve encryption (ECC). When a symmetric encryption algorithm is used, the data providing apparatus and the data processing apparatus 300 may further exchange encryption secrets. Specifically, the data providing apparatus and the data processing apparatus 300 may exchange the encryption secrets by using a Diffie-Hellman (D-H) secret exchange algorithm.

The foregoing encryption algorithm may alternatively be a user-defined encryption algorithm. The data providing apparatus may share the encryption algorithm with the data processing apparatus 300, so that the data processing apparatus 300 obtains the user-defined encryption algorithm based on an identifier of the user-defined encryption algorithm, and constructs, based on the encryption algorithm, the ciphertext computation function corresponding to the plaintext computation function.

In some implementations, the requirement description may alternatively not include an identifier of the encryption algorithm. Correspondingly, the data processing apparatus 300 may provide a preset encryption algorithm, and the data providing apparatus performs encryption based on the encryption algorithm preset by the data processing apparatus 300.

In some implementations, the data processing apparatus 300 may alternatively preset data processing logic. For example, the data processing apparatus 300 prestores at least one plaintext computation function and a corresponding ciphertext computation function. In this way, the data providing apparatus does not need to send the requirement description, and is configured to construct the ciphertext computation function. In other words, S402 may not be performed when the data processing method in this embodiment of this application is performed.

S404: The data processing apparatus 300 constructs a ciphertext computation function corresponding to the data processing requirement.

The data processing apparatus 300 first obtains the plaintext computation function based on the requirement description in the data processing requirement. The data processing apparatus 300 may construct the plaintext computation function based on the input data and the output data in the requirement description and by using an association relationship between the data. For example, if the input data includes a salary payable of a current month and a tax rate, and the output data includes a net salary of the current month, the plaintext computation function may be constructed as follows:

$$y=f(m_1,m_2)=m_1-m_1*m_2=m_1(1-m_2) \qquad (2)$$

Herein, y represents the net salary of the current month, $m_1$ represents the salary payable of the current month, and $m_2$ represents the tax rate.

When the requirement description includes the data processing logic, the data processing apparatus 300 may construct the plaintext computation function based on the data processing logic represented in a text form, or directly obtain the plaintext computation function based on the data processing logic represented in a plaintext computation function form.

The requirement description may further include privacy levels of the input data. The input data may be classified into first privacy data and second privacy data according to the privacy levels. The first privacy data is data whose privacy level is higher than a preset level, and the second privacy data is data whose privacy level is not higher than the preset level. Because the second privacy data may be used in computation in a plaintext form, the data processing apparatus 300 may use the second privacy data in the plaintext computation function as the constant term.

It is assumed that an original plaintext computation function is:

$$y = f(m_2, m_3, m_4, m_5) = a_0 + a_1 m_1 + a_2 m_2^2 + a_3 m_3^3 + a_4 m_4^4 + a_5 m_5^5 \quad (3)$$

Herein, when $m_4$ and $m_5$ are the second privacy data, the plaintext computation function may alternatively be expressed as:

$$y = f(m_1, m_2, m_3, m_4, m_5) = a_0' + a_1 m_1 + a_2 m_2^2 + a_3 m_3^3; \quad (4)$$
$$a_0' = a_0 + a_4 m_4^4 + a_5 m_5^5$$

Herein, $a_0'$ is a constant term of the simplified plaintext computation function, and $a_0$ is a constant term of the original plaintext computation function.

Then, the data processing apparatus 300 constructs a corresponding ciphertext computation function based on the simplified plaintext computation function. For example, the data processing apparatus may construct the corresponding ciphertext computation function based on the plaintext computation function shown in formula (4). When the input data is encrypted by using different encryption algorithms, the ciphertext computation function constructed based on the plaintext computation function may be different. For ease of understanding, this embodiment of this application further provides an example of the ciphertext computation function, as shown below:

$$Y = F(E(m_1), E(m_2), E(m_3), m_4, m_5) \quad (5)$$

Herein, Y represents the ciphertext of the data processing result, and F represents the ciphertext computation function. It should be noted that formula (4) and formula (5) further meet the following relationship:

$$Y = E(y) \quad (6)$$

The ciphertext computation function includes a constant term and a non-constant term, the constant term is an item irrelevant to a ciphertext of the first privacy data, and the non-constant term is an item related to the ciphertext of the first privacy data. Herein, $m_4$ and $m_5$ are input into the constant term of the ciphertext computation function, and $E(m_1)$, $E(m_2)$, and $E(m_3)$ are input into the non-constant term of the ciphertext computation function, so that secure computation can be implemented.

When data processing logic is preset in the data processing apparatus 300, for example, when the data processing apparatus 300 prestores at least one plaintext computation function and a corresponding ciphertext computation function, S404 may not be performed when the data processing method in this embodiment of this application is performed.

S406: The data processing apparatus 300 returns the encryption algorithm to the data providing apparatus.

When the data providing apparatus does not specify the encryption algorithm, for example, the data processing requirement does not carry the identifier of the encryption algorithm, the data processing apparatus 300 may further return the encryption algorithm to the data providing apparatus. In some implementations, the data processing apparatus 300 may return the identifier of the encryption algorithm, for example, a name of a disclosed encryption algorithm. In this way, the data providing apparatus may obtain the corresponding encryption algorithm based on the identifier of the encryption algorithm.

When the data providing apparatus specifies the encryption algorithm, the data processing apparatus may not perform S406.

Further, when the data processing apparatus 300 is a data processing apparatus that provides a specific function and meets a specific requirement, S402 to S406 may not be performed. The data processing apparatus 300 provides a specific function based on a specific plaintext computation function and a specific ciphertext computation function, to meet a specific requirement.

S408: The data providing apparatus encrypts the first privacy data by using the encryption algorithm to obtain the ciphertext of the first privacy data.

Privacy data is data that carries privacy information, and privacy information is information that a user does not want others to know. In some examples, the privacy data may include an identity card number, asset data, income data, tax payment data, disease diagnosis data, or the like.

The privacy data has corresponding privacy levels. The privacy level represents a privacy degree of the privacy data. The privacy data may be classified into first privacy data and second privacy data according to the privacy levels. The first privacy data is data whose privacy level is higher than the preset level, and the second privacy data is data whose privacy level is not higher than the preset level.

When the privacy data includes two privacy levels, the first privacy data is privacy data with a high privacy level, and the second privacy data is privacy data with a low privacy level. For example, the privacy level includes two levels: absolute privacy and relative privacy. Absolute privacy refers to a level at which once content is disclosed, user privacy security will be endangered. Relative privacy refers to a level at which even if content is disclosed, user privacy security will not be endangered as long as a data subject is not contacted. A privacy level of absolute privacy is higher than a privacy level of relative privacy. Therefore, the first privacy data may be absolute privacy data, for example, a salary payable of a current month, and the second privacy data may be relative privacy data, for example, a tax rate.

The data providing apparatus may first determine that data used for computation is first privacy data or second privacy data, and then encrypt the first privacy data by using the encryption algorithm to obtain the ciphertext of the first privacy data. In some possible implementations, the data processing apparatus 300 may determine a reference privacy level of the data based on an encryption status of historical data submitted by the data providing apparatus, and then provide the foregoing reference privacy level for the data providing apparatus. In this way, the user may determine a privacy level of the data based on the reference privacy level presented by the data providing apparatus.

Figure 5:
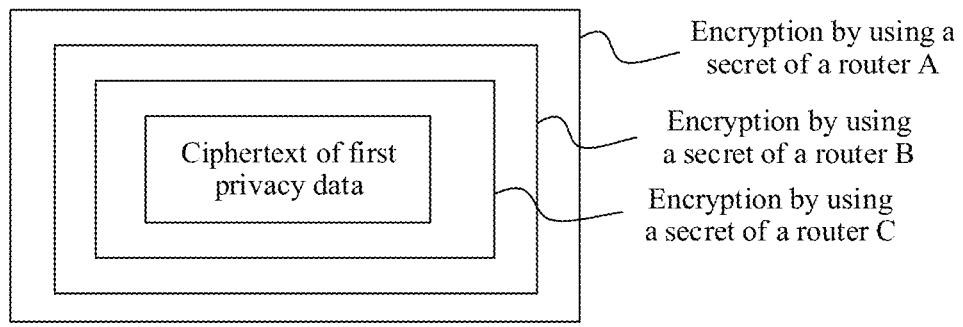
FIG. 5 is a schematic diagram of a data processing configuration interface according to an embodiment of this application.

Refer to a diagram of a data processing configuration interface shown in FIG. 5. Data names of to-be-processed data are displayed in the interface, for example, $m_1 \ldots m_n$. The user may input, through the interface, a data value corresponding to each data name, and a reference privacy level corresponding to each piece of data provided by the data processing apparatus 300 may further be displayed in the interface. The reference privacy level includes two levels: absolute privacy and relative privacy. As shown in FIG. 5, a solid circle represents absolute privacy, and a hollow circle represents relative privacy. The user may directly use the reference privacy level as a privacy level of data, or may modify the reference privacy level, for example, select or deselect the reference privacy level, to obtain the privacy level of the data. The data providing apparatus determines the first privacy data based on the privacy level, and encrypts the first privacy data to obtain the ciphertext of the first privacy data. The second privacy data remains in plaintext.

Usually, statistical distribution of basic elements (for example, letters) in a plaintext is regular, and statistical distribution of basic elements in a ciphertext is random. Based on this, the data processing apparatus 300 may determine, based on statistical distribution of basic elements in the input data, whether the input data is in plaintext or ciphertext.

In some implementations, the data providing apparatus and the data processing apparatus 300 may pre-agree on an encryption status of input data, to be specific, pre-agree on input data that is in plaintext and input data that is in ciphertext. For example, when the data providing apparatus sends the data processing requirement in S402, the data processing requirement may further carry an identifier representing whether each piece of input data is in plaintext or ciphertext. In this way, the data processing apparatus 300 may determine, based on the identifier, whether the input data is in plaintext or ciphertext.

In some cases, a data provider may alternatively add a ciphertext identifier when processing the data, so that the data processing apparatus 300 determines, based on the ciphertext identifier, whether the input data is in plaintext or ciphertext. Specifically, the ciphertext identifier may be a ciphertext quantity Q, and represents that the first Q pieces of data provided by the data provider are in ciphertext, that is, the ciphertext of the first privacy data. The ciphertext identifier may alternatively be an identifier sequence indicating whether each piece of data is in ciphertext, for example, 111001100011, where 1 represents that data is in ciphertext, and 0 represents that data is in plaintext.

S410: The data providing apparatus determines whether to submit the ciphertext of the first privacy data and the second privacy data anonymously. If yes, S412 is performed, or if not, S416 is performed.

Being anonymous means that a user name is not disclosed. In this embodiment of this application, anonymous submission means submission without disclosing an identifier of a sender. Anonymous submission may include a plurality of implementations, for example, may be implemented in any one of a plurality of manners such as onion routing, garlic routing, and Klein bottle routing.

In some possible implementations, the user may choose whether to submit the ciphertext of the first privacy data and the second privacy data anonymously. Refer to the diagram of the data processing configuration interface shown in FIG. 5. The user may select or deselect an anonymous submission control (for example, a square selection control shown in FIG. 5, which is solid after being selected, and is hollow if not selected). The data providing apparatus determines whether to use the anonymous submission method based on the foregoing operation of the user.

In some embodiments, the user may alternatively separately select, for the ciphertext of the first privacy data and the second privacy data, whether to submit the ciphertext of the first privacy data and the second privacy data anonymously. For example, the user may choose to submit the second privacy data anonymously, and submit the ciphertext of the first privacy data non-anonymously.

S412: The data providing apparatus encrypts the ciphertext of the first privacy data and the second privacy data by using a secret of an onion router, to obtain an onion data packet.

S414: The data providing apparatus sends the onion data packet to the data processing apparatus 300 through the onion router.

In this embodiment of this application, onion routing is used as an example to describe anonymous submission. In an onion routing network, a message is encrypted and packaged layer by layer as an onion-like onion data packet, and is sent through a series of network nodes that are called onion routers. Each time the data packet passes through an onion router, the outermost layer of the data packet is decrypted, and the last layer of the data packet is decrypted when the data packet arrives at a destination. In this way, the destination can obtain the original message. Through this series of encryption and packaging, each network node (including the destination) can only learn a location of a last node, but cannot learn an entire sending path and an address of an original sender. As long as it is ensured that at least one node does not disclose its own routing path, a leakage of the whole data can be avoided, and privacy security can be ensured.

Figure 6:
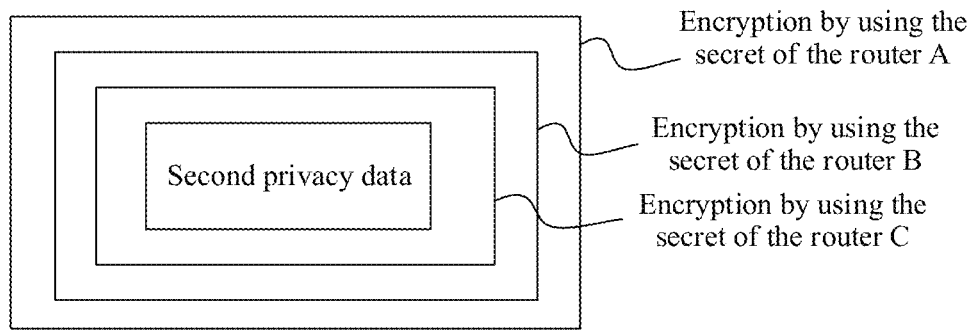
FIG. 6 is a schematic diagram of structures of onion data packets according to an embodiment of this application.

The data providing apparatus separately encrypts the ciphertext of the first privacy data and the second privacy data by using a secret of the onion router, to obtain a first onion data packet and a second onion data packet. FIG. 6 further shows structures of the first onion data packet and the second onion data packet. As shown in FIG. 6, the first onion data packet is a data packet obtained by encrypting the ciphertext of the first privacy data by sequentially using secrets of a router C, a router B, and a router A. When the first onion data packet passes through the router C, the outermost layer of the first onion data packet is decrypted by the router C. When the first onion data packet passes through the router B, an encryption layer that is of the first onion data packet and encrypted by using a secret of the router B is decrypted by the router B. When the first onion data packet passes through the router C, an encryption layer that is of the first onion data packet and encrypted by using a secret of the router C is decrypted by the router C. In this way, the ciphertext of the first privacy data arrives at a destination, that is, the data processing apparatus 300.

Similarly, the second onion data packet is a data packet obtained by encrypting the second privacy data by sequentially using the secrets of the router C, the router B, and the router A. When the second onion data packet passes through the router C, the router B, and the router A, encryption layers that are of the second onion data packet and encrypted by using the secrets of the router C, the router B, and the router A are sequentially decrypted. In this way, the second privacy data arrives at the data processing apparatus 300.

FIG. 6 is described merely by using an example in which the onion routing network includes three onion routers. In some embodiments, the onion routing network may alternatively include one onion router, two onion routers, or more than three onion routers.

Further, in this embodiment of this application, anonymous submission being performed in an onion routing manner is merely used as an example for description. In another possible implementation of this embodiment of this application, the data providing apparatus may alternatively implement anonymous submission in another manner, for example, in a garlic routing manner.

S416: The data providing apparatus sends the ciphertext of the first privacy data and the second privacy data to the data processing apparatus 300.

In some implementations, when the data providing apparatus determines not to perform anonymous submission, the data providing apparatus may directly send the ciphertext of the first privacy data and the second privacy data to the data processing apparatus 300.

S418: The data processing apparatus 300 processes the ciphertext of the first privacy data and the second privacy data by using the ciphertext computation function, to obtain the ciphertext of the data processing result.

Specifically, the data processing apparatus 300 inputs the ciphertext of the first privacy data such as $E(m_1)$, ..., and $E(m_k)$ and the second privacy data such as $m_{k+1}$, ... and $m_n$ into the ciphertext computation function, to obtain the ciphertext of the data processing result. Because the second privacy data is in plaintext, an amount of input ciphertext in the ciphertext computation function is reduced, computation complexity is greatly reduced, and computation efficiency is improved.

Specifically, the data processing apparatus 300 may implement ciphertext function computation in a manner of constructing a computation network by using a logical gate. A quantity of logic gates required by the data processing apparatus 300 to construct the computation network is related to the ciphertext input. The more ciphertext is input, the more complex the computation network is constructed, and more logic gates are required. Therefore, reducing the amount of input ciphertext can effectively reduce the quantity of logic gates required for constructing the computation network.

Figure 7:
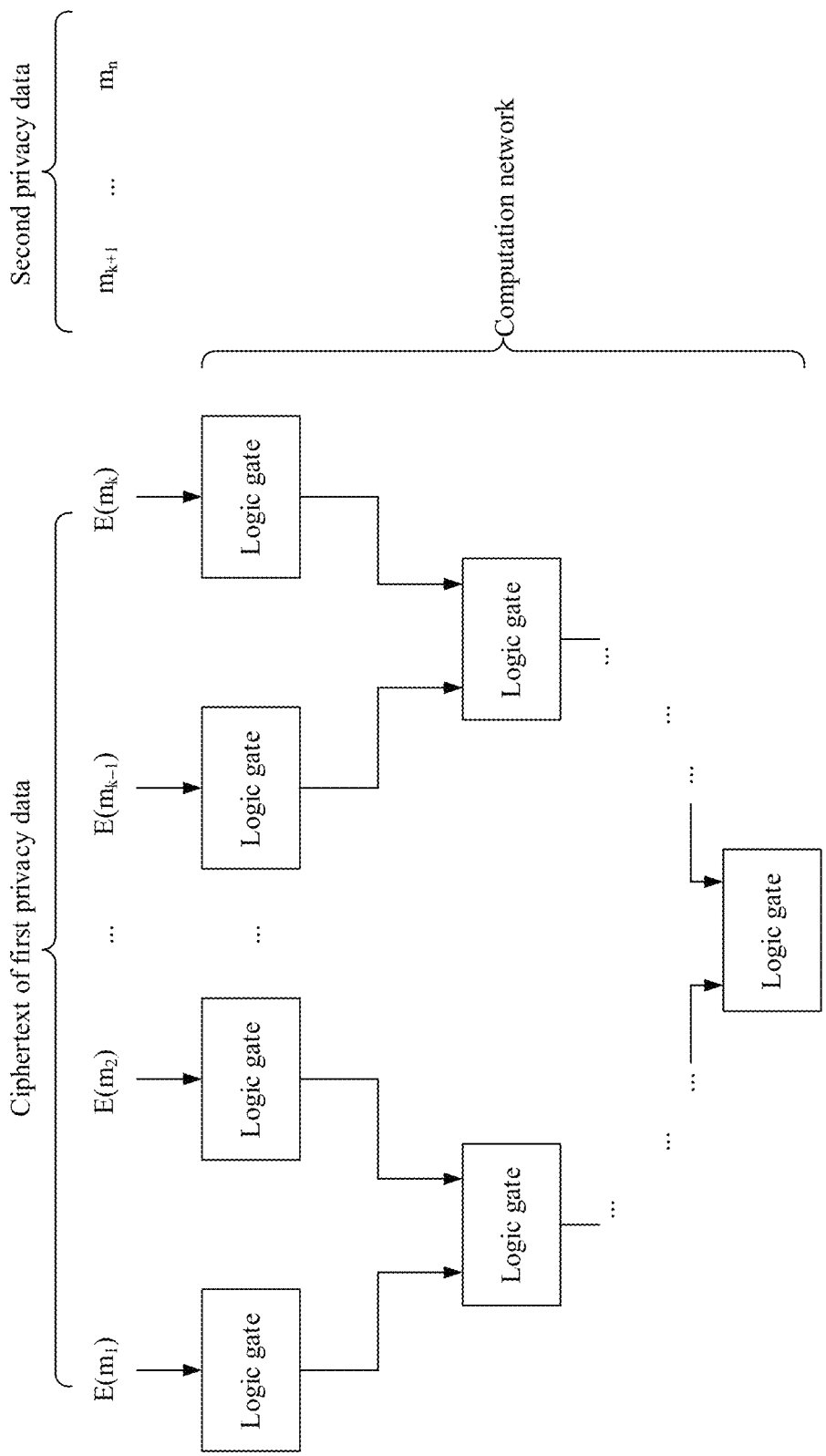
FIG. 7 is a schematic diagram of a structure of a computation network according to an embodiment of this application.

As shown in FIG. 7, for n pieces of privacy data: $m_1, m_2, \ldots m_k, \ldots m_n$, the data providing apparatus encrypts k pieces of absolute privacy data: $m_1, m_2, \ldots m_k$ by using the encryption algorithm to obtain the ciphertext of the first privacy data, that is, $E(m_1), E, \ldots E(m_k)$. The data providing apparatus submits the ciphertext $E(m_1), E(m_2), \ldots E(m_k)$ of the first privacy data and the second privacy data $m_{k+1}, \ldots m_n$ to the data processing apparatus 300. The data processing apparatus 300 may construct a logic gate for $E(m_1), E(m_2), E(m_k)$, and does not need to construct a logic gate for $m_{k+1}, \ldots m_n$. This simplifies the computation network, and reduces the quantity of logic gates. Therefore, a computation amount required to ensure correct computation and data privacy is reduced.

The data processing apparatus 300 does not know the secret used by the data providing apparatus to encrypt the first privacy data, and it is difficult for the data processing apparatus 300 to decrypt the ciphertext of the first privacy data to obtain the first privacy data. Instead, the ciphertext of the first privacy data is directly input into the ciphertext computation function, thereby ensuring security of the first privacy data.

S420: The data processing apparatus 300 returns the ciphertext of the data processing result to the data providing apparatus.

S422: The data providing apparatus decrypts the ciphertext of the data processing result to obtain the data processing result.

Specifically, the data providing apparatus may execute an inverse process of the encryption algorithm to decrypt the ciphertext of the data processing result, so as to obtain the data processing result. In this way, the data processing result is prevented from being stolen in a transmission process, and security is ensured.

In some implementations, when the data processing result does not carry privacy information or a privacy level is low, if the data processing apparatus 300 obtains the secret for encrypting the first privacy data, the data processing apparatus 300 may alternatively decrypt the ciphertext of the data processing result by using the secret, to obtain the data processing result, and then return the data processing result to the data providing apparatus. Further, the data processing apparatus may alternatively encrypt the data processing result based on an encryption algorithm specified by the data providing apparatus, for example, E'. In this way, the data providing apparatus may obtain the data processing result through decryption.

In some implementations, the data providing apparatus may alternatively combine an encryption algorithm E provided by the data processing apparatus 300 with the encryption algorithm E' provided by the data providing apparatus, to obtain a new encryption algorithm E", and encrypt the first privacy data by using the new encryption algorithm E". For example, two data providing apparatuses may combine public secrets of the two data providing apparatuses, and perform encryption by using the new encryption algorithm E". In this case, any private secret is used for only partial decryption, and complete decryption can be completed after partial decryption is separately performed by using private secrets of the two data providing apparatuses and the data processing apparatus 300.

In consideration of security, the data providing apparatus may alternatively encrypt the ciphertext of the first privacy data and the second privacy data, and the data processing apparatus 300 obtains the ciphertext of the first privacy data and the second privacy data through decryption, and performs data processing based on the ciphertext of the first privacy data and the second privacy data. In this way, security of data in a transmission process is ensured, and data processing efficiency is improved by reducing ciphertext input.

Based on the foregoing content descriptions, an embodiment of this application provides a data processing method. In the method, different privacy protection mechanisms are used for privacy data of different privacy levels. Specifically, first privacy data with a high privacy level is encrypted and then submitted to the data processing apparatus 300, and second privacy data with a low privacy level is submitted to the data processing apparatus 300 anonymously. Because the second privacy data is in plaintext, ciphertext input of a ciphertext computation function is reduced, and computation efficiency is improved, thereby improving service response efficiency and service performance. In addition, consumption and costs of anonymous communication are far less than a burden brought by more ciphertext input to secure computation, thereby reducing data processing costs.

The embodiment shown in FIG. 4A and FIG. 4B is mainly described by using an example from a perspective of providing data by a single data provider for processing (that is, a single-user scenario). In some implementations, a plurality of data providers may provide data to the data processing apparatus 300 for processing. The following describes an implementation in which a plurality of data providers provide data for data processing.

In some implementations, a plurality of data providers separately provide data in different dimensions. In some embodiments, input data has n dimensions, and the input data may be represented as $m_1, m_2, \ldots m_k, \ldots m_n$, where $m_1, m_2, \ldots m_k$ is first privacy data, and $m_{k+1}, \ldots m_n$ is second privacy data. At least one data provider in the plurality of data providers may provide both first privacy data and second privacy data. For example, a data provider 1 provides data $m_1, m_2, m_{k+1}, \ldots m_{n-1}$ and a data provider 2 provides data $m_3, m_4, \ldots m_k, m_n$. Certainly, some data providers in the plurality of data providers may provide only first privacy data, and some other data providers may provide only second privacy data. For example, the data provider 1 provides data $m_1, m_2, \ldots m_k$, and the data provider 1 provides data $m_{k+1}, \ldots m_n$.

Specifically, when a data providing apparatus sends a data processing requirement to the data processing apparatus 300, the data processing apparatus 300 constructs, according to the data processing requirement, a ciphertext computation function corresponding to the data processing requirement, and then returns an encryption algorithm to the data providing apparatus that provides first privacy data. Based on this, if the plurality of data providing apparatuses provide both first privacy data and second privacy data, the data processing apparatus 300 separately returns the encryption algorithm to the plurality of data providing apparatuses. If some data providing apparatuses in the plurality of data providing apparatuses provide first privacy data and some data providing apparatuses in the plurality of data providing apparatuses provide second privacy data, the data processing apparatus 300 returns the encryption algorithm to the data providing apparatuses that provide first privacy data.

The data providing apparatus that provides the first privacy data encrypts the first privacy data by using the foregoing encryption algorithm, to obtain a ciphertext of the first privacy data. Each data providing apparatus determines to submit the ciphertext of the first privacy data and the second privacy data anonymously. That the data providing apparatus submits the ciphertext of the first privacy data and the second privacy data anonymously may be: sequentially encrypting the ciphertext of the first privacy data by using secrets of a plurality of onion routers, to obtain a first onion data packet, and sequentially encrypting the second privacy data by using secrets of a plurality of onion routers, to obtain a second onion data packet. Then, the first onion data packet and the second onion data packet are transmitted through the onion routers.

Each time the onion data packets pass through an onion router, encryption layers generated by encrypting the onion data packets by using a secret of the onion router is decrypted by the onion router. In this way, the ciphertext of the first privacy data and the second privacy data arrive at the data processing apparatus 300. The data processing apparatus 300 inputs the ciphertext of the first privacy data and the second privacy data into the ciphertext computation function for processing, to obtain a ciphertext of a data processing result. Then, the data processing apparatus 300 returns the ciphertext of the data processing result to the data providing apparatus that sends the data processing requirement. The data providing apparatus executes an inverse algorithm of the encryption algorithm, and decrypts the ciphertext of the data processing result to obtain the data processing result.

In some other implementations, a plurality of data providers may alternatively separately provide data of a same dimension. When one data providing apparatus sends a data processing requirement to the data processing apparatus 300, the data processing apparatus 300 returns a corresponding encryption algorithm to a plurality of data providers after constructing a ciphertext computation function corresponding to the data processing requirement. Each data providing apparatus encrypts first privacy data by using an encryption algorithm to obtain a ciphertext of the first privacy data, and then submits the ciphertext of the first privacy data and second privacy data anonymously. The data processing apparatus 300 processes, by using the ciphertext computation function, the ciphertext of the first privacy data and the second privacy data that are submitted by each data providing apparatus, to obtain a ciphertext of a data processing result, and returns the ciphertext of the data processing result to the data providing apparatus that sends the data processing requirement. The data providing apparatus decrypts the ciphertext of the data processing result to obtain the data processing result.

To facilitate understanding of the solutions of this application, the foregoing data processing method is further described in detail in embodiments of this application with reference to some exemplary scenarios.

A typical application of the single-user scenario is software as a service (SaaS). SaaS provides a new software delivery mode. Specifically, software and related data are hosted on a cloud service, and a user can use the software by accessing the cloud service without performing a conventional software installation step. In this delivery mode, the user usually uses a simplified client, for example, a browser, to access the cloud service to use the software online. In this way, leasing instead of purchasing reduces usage costs. In addition, downloading and installation are not required, which overcomes limitations of network performance and hardware performance on software usage.

In an SaaS scenario, the user wants to maintain personal privacy when obtaining a network service. When user privacy is very important and costs of ciphertext computation are high, relative privacy data can be separated to simplify privacy protection. An efficient and low-cost anonymous communication network is used to protect relative privacy data. Expensive secure computation needs to process only absolute privacy data. In this way, overall data processing efficiency can be improved while privacy security is ensured, and a privacy protection requirement of the General Data Protection Regulation (GDPR) is met.

Specifically, many applications may use the SaaS delivery mode. For example, the SaaS delivery mode can be used for applications such as financial system, collaboration software, customer relationship management, management information system, enterprise resource planning, billing system, human resource management, content management, and service desk management.

The financial system is used as an example. Financial information submitted by an enterprise is privacy data, but the privacy data can be further classified based on a privacy level. An industrial and commercial registration number, a tax number, a stock code, a specific address, a bank account, transaction object information, dividend shareholder information, loan bank information, a value-added tax invoice, and audit information of an enterprise are absolute privacy data and cannot be disclosed. Information such as a debt ratio, a loan interest rate, a dividend and dividend proportion, a region, a tax rate, and credit rating is usually relative privacy data.

In some implementations, information such as total expenditure, labor expenditure, procurement expenditure, tax expenditure, insurance expenditure, interest expenditure, daily operation expenditure, administrative penalty expenditure, total revenue, sales revenue, fixed asset benefit, tax refund amount, total investment amount, and total loan amount may also be classified into relative privacy data.

When the user submits input data to the financial system through a browser, absolute privacy data such as an industrial and commercial registration number, a tax number, and a stock code can be encrypted, and then an encrypted industrial and commercial registration number, an encrypted tax number, an encrypted stock code, a debt ratio, a loan interest rate, and a dividend distribution ratio can be submitted anonymously. In this way, ciphertext input in a ciphertext computation function can be greatly reduced, a computation amount of secure computation can be reduced, and computation efficiency can be improved.

A typical application of the multi-user scenario is artificial intelligence (AI) model training. When an AI model is trained, a large amount of data of a data subject usually needs to be collected for machine learning. For example, when an intelligent diagnosis model is trained, detection data of a large quantity of patients needs to be collected. The detection data may specifically include laboratory sheets and/or scan images. To ensure patient privacy, detection data of each patient usually needs to be encrypted, and then machine learning is performed based on a ciphertext. In addition to identity information of a data subject, such as a name and contact information, most of the detection data is relative private data. Therefore, most data can meet a privacy requirement after being anonymized, and complex ciphertext computation is not required.

An example is that an intelligent diagnosis system needs to learn various detection data of a large quantity of patients, including various laboratory sheets (including various blood and urine indicators) and scan images (X-ray, B-mode ultrasonography, and magnetic resonance imaging). As long as the medical detection data is not associated with identities of the patients, the medical detection data does not damage user privacy and can be input, for learning, into the AI model in plaintext after being anonymized. No matter how complex the machine learning algorithm for the relative privacy data is, the relative privacy data is not used in inefficient ciphertext computation, thereby improving computation efficiency.

The foregoing describes in detail the data processing methods provided in embodiments of this application with reference to FIG. 1 to FIG. 7. The following describes an apparatus, a system, and a device provided in embodiments of this application with reference to the accompanying drawings.

Refer to a schematic diagram of a structure of a data processing apparatus shown in FIG. 3. The apparatus 300 includes:
  a communication module 302, configured to receive a ciphertext of first privacy data and second privacy data, where the ciphertext of the first privacy data is obtained by encrypting the first privacy data by using an encryption algorithm; and
  a processing module 304, configured to input the ciphertext of the first privacy data and the second privacy data into a ciphertext computation function, to obtain a ciphertext of a data processing result, where the ciphertext computation function corresponds to the encryption algorithm.

The communication module 302 is further configured to send the ciphertext of the data processing result to a data providing apparatus.

In some possible implementations, the data processing apparatus further includes a construction module 306.

The communication module 302 is further configured to receive a data processing requirement sent by the data providing apparatus.

The construction module 306 is configured to construct the ciphertext computation function according to the data processing requirement.

In some possible implementations, the data processing requirement includes an identifier of the encryption algorithm.

The construction module 306 is configured to:
  construct, according to the data processing requirement, the ciphertext computation function corresponding to the encryption algorithm.

In some possible implementations, the ciphertext computation function includes a constant term.

The processing module 304 is configured to:
  input the second privacy data as the constant term into the ciphertext computation function.

In some possible implementations, the data processing apparatus cannot decrypt the ciphertext of the first privacy data.

The data processing apparatus 300 according to this embodiment of this application may correspondingly perform the methods described in embodiments of this application, and the foregoing and other operations and/or functions of the modules/units of the data processing apparatus 300 are separately used to implement corresponding procedures of the method in the embodiment shown in FIG. 4A and FIG. 4B. For brevity, details are not described herein again.

Figure 8:
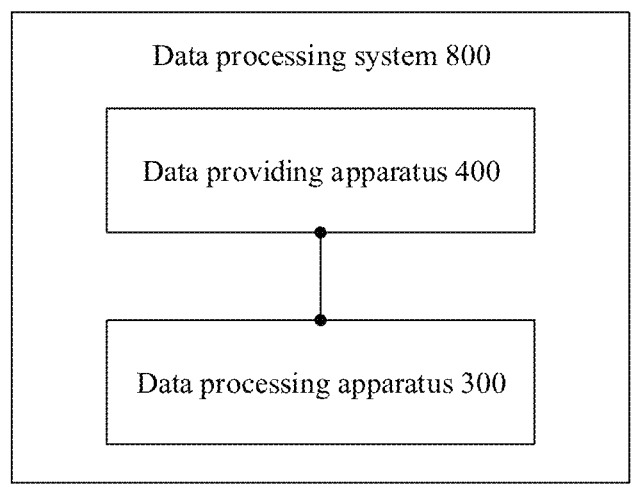
FIG. 8 is a schematic diagram of a data processing system according to an embodiment of this application.

Next, refer to a schematic diagram of a structure of a data processing system shown in FIG. 8. The data processing system 800 includes:
  a data providing apparatus 400, configured to obtain first privacy data, encrypt the first privacy data by using an encryption algorithm to obtain a ciphertext of the first privacy data, obtain second privacy data, and then send the ciphertext of the first privacy data and the second privacy data to the data processing apparatus 300; and
  the data processing apparatus 300, configured to input the ciphertext of the first privacy data and the second privacy data into a ciphertext computation function to obtain a ciphertext of a data processing result, and send the ciphertext of the data processing result to the data providing apparatus 400, where the ciphertext computation function corresponds to the encryption algorithm.

The data providing apparatus 400 is further configured to obtain the data processing result based on the ciphertext of the data processing result.

In some possible implementations, the data providing apparatus 400 is further configured to:
  obtain a data processing requirement, and send the data processing requirement to the data processing apparatus.

The data processing apparatus 300 is further configured to:
  construct the ciphertext computation function according to the data processing requirement.

In some possible implementations, the data processing requirement includes an identifier of the encryption algorithm.

The data processing apparatus 300 is configured to:
construct, according to the data processing requirement, the ciphertext computation function corresponding to the encryption algorithm.

In some possible implementations, the ciphertext computation function includes a constant term.

The data processing apparatus 300 is configured to:
input the second privacy data as the constant term into the ciphertext computation function.

In some possible implementations, the data providing apparatus 400 does not encrypt the second privacy data by using the encryption algorithm.

In some possible implementations, the data processing apparatus 300 cannot decrypt the ciphertext of the first privacy data.

In some possible implementations, a privacy level of the first privacy data is higher than a privacy level of the second privacy data.

In some possible implementations, the data providing apparatus 400 is configured to:
present a user interface to a user;
receive, through the user interface, a privacy level input by the user;
obtain the first privacy data and the second privacy data from input data of the user based on the privacy level.

In some possible implementations, the data providing apparatus 400 is further configured to:
send the second privacy data to the data processing apparatus anonymously.

The data processing system 800 according to this embodiment of this application may correspondingly perform the methods described in embodiments of this application, and the foregoing and other operations and/or functions of the apparatuses of the data processing system 800 are separately used to implement corresponding procedures of the method in the embodiment shown in FIG. 4A and FIG. 4B. For brevity, details are not described herein again.

An embodiment of this application further provides a device 900. The device 900 may be an end-side device, for example, a notebook computer or a desktop computer, or may be a computer cluster in a cloud environment or an edge environment. The device 900 is configured to implement a function of the data processing apparatus 300 in the embodiment shown in FIG. 3.

Figure 9:
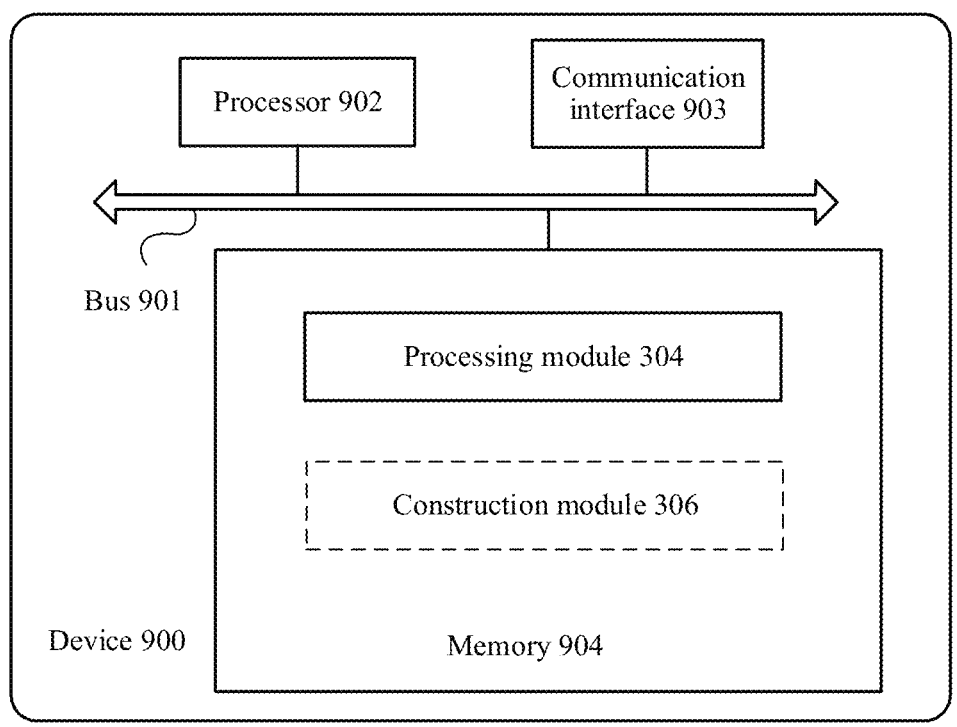
FIG. 9 is a schematic diagram of a structure of a device according to an embodiment of this application.

FIG. 9 provides a schematic diagram of a structure of the device 900. As shown in FIG. 9, the device 900 includes a bus 901, a processor 902, a communication interface 903, and a memory 904. The processor 902, the memory 904, and the communication interface 903 communicate with each other through the bus 901.

The bus 901 may be a peripheral component interconnect (PCI) bus, an extended industry standard architecture (EISA) bus, and or the like. Buses may be classified into an address bus, a data bus, a control bus, and the like. For ease of representation, only one thick line is used to represent the bus in FIG. 9, but this does not mean that there is only one bus or only one type of bus.

The processor 902 may be any one or more of processors such as a central processing unit (CPU), a graphics processing unit (GPU), a microprocessor (MP), or a digital signal processor (DSP).

The communication interface 903 is configured to communicate with the outside, for example, receive the ciphertext of the first privacy data and the second privacy data, receive the data processing requirement sent by the data providing apparatus 400, and send the ciphertext of the data processing result to the data providing apparatus 400.

The memory 904 may include a volatile memory, for example, a random access memory (RAM). The memory 904 may alternatively include a non-volatile memory, for example, a read-only memory (ROM), a flash memory, a hard disk drive (HDD), or a solid state drive (SSD).

The memory 904 stores executable code, and the processor 902 executes the executable code to perform the foregoing data processing methods.

Specifically, when the embodiment shown in FIG. 3 is implemented, and the modules of the data processing apparatus 300 described in the embodiment in FIG. 3 are implemented by using software, software or program code required for executing the functions of the processing module 304 and the construction module 306 in FIG. 3 is stored in the memory 904. A function of the communication module 302 is implemented through the communication interface 903.

The communication interface 903 receives the ciphertext of the first privacy data and the second privacy data, and transmits the ciphertext of the first privacy data and the second privacy data to the processor 902 through the bus 901. The processor 902 executes program code corresponding to each module stored in the memory 904, for example, program code corresponding to the processing module 304, to perform the step of inputting the ciphertext of the first privacy data and the second privacy data into the ciphertext computation function, to obtain the ciphertext of the data processing result.

In some possible implementations, the communication interface 903 further receives the data processing requirement, the processor 902 transmits the data processing requirement to the processor 902 through the bus 901, and the processor 902 executes program code corresponding to each module stored in the memory 904, for example, program code corresponding to the construction module 306, to perform the step of constructing the ciphertext computation function according to the data processing requirement.

In some possible implementations, the data processing requirement includes an identifier of the encryption algorithm. The processor 902 executes program code corresponding to the construction module 306, to perform the following steps:
constructing, according to the data processing requirement, the ciphertext computation function corresponding to the encryption algorithm.

In some possible implementations, the ciphertext computation function includes a constant term. The processor 902 executes program code corresponding to the processing module 304, to perform the following steps:
inputting the second privacy data as the constant term into the ciphertext computation function.

In some possible implementations, the data processing apparatus cannot decrypt the ciphertext of the first privacy data.

Based on the description of the foregoing implementations, a person skilled in the art may clearly understand that this application may be implemented by software in addition to necessary universal hardware, or by dedicated hardware, including a dedicated integrated circuit, a dedicated central processing unit (CPU), a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this application, software program implementation is a better implementation in most cases. Based on such an understanding, the solutions of this application essentially or the part contributing to the conventional technology may be implemented in a form of a software product. The computer software product is stored in a readable storage medium, such as a floppy disk, a universal serial bus (USB) flash drive, a removable hard disk, a read-only memory (ROM), a random-access memory (RAM), a magnetic disk, or an optical disc of a computer, and includes several instructions for instructing a computer device (which may be a personal computer, a training device, or a network device) to perform the methods described in embodiments of this application.

All or some of the foregoing embodiments may be implemented by using software, hardware, firmware, or any combination thereof. When software is used to implement the embodiments, all or a part of the embodiments may be implemented in a form of a computer program product.

The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a training device or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state disk (SSD)), or the like.

The foregoing descriptions are merely exemplary implementations of this application. Any variation or replacement readily figured out by a person skilled in the art based on the exemplary implementations provided in this application shall fall within the protection scope of this application.

What is claimed is:

1. A data processing method, applied to a data processing system that provides secure computation for a user by using a ciphertext computation function, wherein the data processing system comprises a data providing apparatus and a data processing apparatus, and wherein the method comprises:
    obtaining, by the data providing apparatus, first privacy data, and encrypting the first privacy data by using an encryption algorithm to obtain a ciphertext of the first privacy data;
    obtaining, by the data providing apparatus, second privacy data;
    sending, by the data providing apparatus, the ciphertext of the first privacy data and the second privacy data to the data processing apparatus;
    inputting, by the data processing apparatus, the ciphertext of the first privacy data and the second privacy data into the ciphertext computation function, to obtain a ciphertext of a data processing result, wherein the ciphertext computation function corresponds to the encryption algorithm;
    sending, by the data processing apparatus, the ciphertext of the data processing result to the data providing apparatus; and
    obtaining, by the data providing apparatus, the data processing result based on the ciphertext of the data processing result.

2. The method according to claim 1, wherein the ciphertext computation function comprises a constant term; and
    wherein inputting, by the data processing apparatus, the ciphertext of the first privacy data and the second privacy data into the ciphertext computation function comprises:
    inputting, by the data processing apparatus, the second privacy data as the constant term into the ciphertext computation function.

3. The method according to claim 1, wherein the data providing apparatus does not encrypt the second privacy data by using the encryption algorithm.

4. The method according to claim 1, wherein the data processing apparatus cannot decrypt the ciphertext of the first privacy data.

5. The method according to claim 1, wherein a privacy level of the first privacy data is higher than a privacy level of the second privacy data.

6. The method according to claim 1, wherein obtaining the ciphertext of the first privacy data and the second privacy data comprises:
    presenting, by the data providing apparatus, a user interface to the user;
    receiving, by the data providing apparatus through the user interface, a privacy level input by the user; and
    obtaining, by the data providing apparatus, the first privacy data and the second privacy data from input data of the user based on the privacy level.

7. The method according to claim 1, wherein the method further comprises:
    sending, by the data providing apparatus, the second privacy data to the data processing apparatus anonymously.

8. The method according to claim 1, wherein the method further comprises:
    obtaining, by the data providing apparatus, a data processing requirement, and sending, by the data providing apparatus, the data processing requirement to the data processing apparatus; and
    constructing, by the data processing apparatus, the ciphertext computation function according to the data processing requirement.

9. The method according to claim 8, wherein the data processing requirement comprises an identifier of the encryption algorithm; and
    wherein constructing, by the data processing apparatus, the ciphertext computation function according to the data processing requirement comprises:
    constructing, by the data processing apparatus according to the data processing requirement, the ciphertext computation function corresponding to the encryption algorithm.

10. A data processing method, applied to a data processing apparatus comprising a processor configured to perform a method, comprising:
    receiving a ciphertext of first privacy data and second privacy data, wherein the ciphertext of the first privacy data is obtained by encrypting the first privacy data by using an encryption algorithm;
    inputting the ciphertext of the first privacy data and the second privacy data into a ciphertext computation function, to obtain a ciphertext of a data processing result, wherein the ciphertext computation function corresponds to the encryption algorithm; and sending the ciphertext of the data processing result to a data providing apparatus.

11. The method according to claim 10, wherein the ciphertext computation function comprises a constant term; and wherein inputting the ciphertext of the first privacy data and the second privacy data into the ciphertext computation function comprises:

inputting the second privacy data as the constant term into the ciphertext computation function.

12. The method according to claim 10, wherein the data processing apparatus cannot decrypt the ciphertext of the first privacy data.

13. The method according to claim 10, wherein the method further comprises:

receiving a data processing requirement sent by the data providing apparatus; and constructing the ciphertext computation function according to the data processing requirement.

14. The method according to claim 13, wherein the data processing requirement comprises an identifier of the encryption algorithm; and wherein constructing the ciphertext computation function according to the data processing requirement comprises:

constructing, according to the data processing requirement, the ciphertext computation function corresponding to the encryption algorithm.

15. A data processing system, wherein the data processing system is configured to provide secure computation for a user by using a ciphertext computation function, and the data processing system comprises a data providing apparatus and a data processing apparatus, wherein the data providing apparatus comprises a data providing processor that is configured to:

obtain first privacy data;

encrypt the first privacy data by using an encryption algorithm to obtain a ciphertext of the first privacy data;

obtain second privacy data; and send the ciphertext of the first privacy data and the second privacy data to the data processing apparatus, and wherein the data processing apparatus comprises a data processing processor that is configured to:

input the ciphertext of the first privacy data and the second privacy data into the ciphertext computation function to obtain a ciphertext of a data processing result; and send the ciphertext of the data processing result to the data providing apparatus, wherein the ciphertext computation function corresponds to the encryption algorithm, and wherein the data providing processor is further configured to obtain the data processing result based on the ciphertext of the data processing result.

16. The system according to claim 15, wherein the ciphertext computation function comprises a constant term, and wherein the data processing processor is configured to:

input the second privacy data as the constant term into the ciphertext computation function.

17. The system according to claim 15, wherein the data providing processor does not encrypt the second privacy data by using the encryption algorithm.

18. The system according to claim 15, wherein the data providing processor is further configured to:

obtain a data processing requirement; and send the data processing requirement to the data processing apparatus, and wherein the data processing processor is further configured to:

construct the ciphertext computation function according to the data processing requirement.

19. The system according to claim 18, wherein the data processing requirement comprises an identifier of the encryption algorithm, and wherein the data processing processor is configured to:

construct, according to the data processing requirement, the ciphertext computation function corresponding to the encryption algorithm.

20. A device, wherein the device comprises a processor and a memory, wherein the processor is configured to execute instructions stored in the memory to cause the device to perform:

receiving a ciphertext of first privacy data and second privacy data, wherein the ciphertext of the first privacy data is obtained by encrypting the first privacy data by using an encryption algorithm;

inputting the ciphertext of the first privacy data and the second privacy data into a ciphertext computation function, to obtain a ciphertext of a data processing result, wherein the ciphertext computation function corresponds to the encryption algorithm; and sending the ciphertext of the data processing result to a data providing apparatus.

* * * * *

UNITED STATES PATENT AND TRADEMARK OFFICE
CERTIFICATE OF CORRECTION

| | |
|---|---|
| PATENT NO. | : 12,204,682 B2 |
| APPLICATION NO. | : 17/973303 |
| DATED | : January 21, 2025 |
| INVENTOR(S) | : Kun Peng |

It is certified that error appears in the above-identified patent and that said Letters Patent is hereby corrected as shown below:

In the Claims

Claim 10: Column 26, Line 62: "receiving a ciphertext of first privacy data and second" should read as -- receiving, from a data providing apparatus, a ciphertext of first privacy data and second --.

Claim 10: Column 27, Line 4: "sending the ciphertext of the data processing result to a" should read as -- sending the ciphertext of the data processing result to the --.

Claim 20: Column 28, Line 36: "receiving a ciphertext of first privacy data and second" should read as -- receiving, from a data providing apparatus, a ciphertext of first privacy data and second --.

Claim 20: Column 28, Line 45-46: "sending the ciphertext of the data processing result to a data providing apparatus." should read as -- sending the ciphertext of the data processing result to the data providing apparatus. --.

Signed and Sealed this
Twelfth Day of August, 2025

Coke Morgan Stewart
*Acting Director of the United States Patent and Trademark Office*